Figure 1:
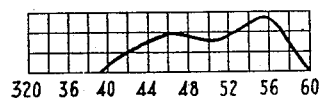

Aug. 19, 1947.              C. D. WILSON              2,425,773
            CYANINE DYES WITH RECURRING CYANINE NUCLEI
                      Filed May 21, 1943

SILVER BROMIDE EMULSION
CONTAINING DYES OF RESPECTIVE
EXAMPLES I TO VII

SILVER CHLORIDE EMULSION
CONTAINING DYES OF
EXAMPLES II-V-VI-VII

Cyril D. Wilson  INVENTOR.

BY
Lynn B. Morris
ATTORNEY

UNITED STATES PATENT OFFICE 2,425,773

CYANINE DYES WITH RECURRING CYANINE NUCLEI

Cyril D. Wilson, Metuchen, N. J., assignor to E. I. du Pont de Nemours & Company, Wilmington, Del., a corporation of Delaware Application May 21, 1943, Serial No. 487,849

11 Claims. (Cl. 260—240)

This invention relates to novel cyanine dyes wherein a cyanine dye nucleus occurs two or more times throughout the molecule. More particularly, it relates to hydrocarbon-poly-cyanine dyes and especially hydrocarbon-bis-cyanine dyes including those of polymeric structure. It also pertains to the dye condensation of a hydrocarbon-poly-heterocyclic nitrogen salt wherein a reactive group is present in the alpha or gamma position to the respective nitrogen atoms of the salt groups with a heterocyclic nitrogen quaternary (or cycloammonium) salt having a reactive group in the alpha or gamma position to the cyclic nitrogen atom. The invention, in addition, relates to processes of preparing such dyes, to photographic emulsions and processes of color photography utilizing such dyes.

One of the objects of this invention is to provide a new class of sensitizing dyes. A further object is to provide new means for sensitizing photographic emulsions. A still further object is to provide substitute materials for conferring an extra range of sensitivity to silver halide emulsions. Another object is to provide a new class of photographic sensitizing dyes which can be used in processes of color photography. Yet another object is to provide a new class of cyanine dyes which contain more than one cyanine dye nucleus in the molecule. A further object is to provide a new class of polymeric sensitizing dyes. A still further object is to provide practical methods for preparing such dyes. Still further objects will be apparent from the following description of the invention.

It has been found that (1) hydrocarbon-poly- and especially hydrocarbon-bis-heterocyclic cyanine dyes and (2) polymeric hydrocarbon-bis-cyanine dye nuclei can be prepared by condensing (A) a poly-heterocyclic quaternary (or poly-cycloammonium) salt which contains in the alpha or gamma position to the heterocyclic nitrogen atoms of the respective nuclei a reactive group capable of entering into a cyanine dye condensation with (B) a heterocyclic or cycloammonium salt having a similar reactive group.

In the case of (1) the reactant (B) should be mono-functional, that is, it must contain a single reactive group capable of entering into a cyanine dye condensation. This reaction may be advantageously carried out by having at least one mol of (B) per each reactive group of the hydrocarbon-poly-cyclo-ammonium salt. However, a small to large excess of one of the reactants (A) or (B) can be used.

The polymeric compounds of case (2), on the other hand, are prepared by using as compound (B) a poly-cyclo-ammonium salt which may be the same as (A) or different. This reaction may be advantageously carried out by having the compounds in equimolecular proportions.

Each of these condensation reactions takes place over a wide range of temperature. The reaction will take place in the presence of a basic condensing agent upon admixing the components in a solvent or diluent medium and allowing the admixture to stand. The condensation, however, is more rapid at elevated temperatures and may be advantageously carried out under reflux conditions using a solvent and acid binding agent or an acid binding solvent, e. g., an organic amine.

The poly-, e. g., bis-, tris-, heterocyclic, quaternary (or cycloammonium) salts can be made after the manner set forth in application Serial No. 409,433, filed September 3, 1941, of which this present application is a continuation-in-part. It comprises reacting a heterocyclic nitrogen base containing in the alpha or gamma position to the heterocyclic nitrogen atom a reactive group which can be used in cyanine dye condensations, such as alpha methyl benzothiazole or alpha methylmercapto quinoline, with a polyfunctional organic compound containing a plurality of functional groups each of which is capable of forming quaternary ammonium salts with ternary nitrogen compounds.

The poly-heterocyclic quaternary or poly-cycloammonium salts formed in the case of the bis salts have the general formula:

wherein A is a bivalent hydrocarbon radical joined to N through aliphatic carbon, Y constitutes the atoms necessary to complete a heterocyclic nitrogen nucleus of the type contained in cyanine dyes, Z is a reactive group capable of dye condensation and one or both of the nitrogen atoms (N) has attached thereto an acid radical. For instance, Y may constitute the atoms necessary to complete an azole radical such as a thiazole, oxazole, selenazole, iminazole, indolenine, dialkylindolenine, or pyridine radical including those having fused carboxylic rings, e. g., benzothiazoles, quinolines, etc.; and Z is a reactive group, e. g., a reactive methyl or methylene group; a halogen atom such as iodine; alkylmercapto, e. g., methylmercapto, ethylmercapto; alkylselenomercapto; acylmethylene derivatives formed by the condensation of a reactive methyl group with an acyl halide, e. g., acetylchloride, propionyl chloride, crotonyl chloride, benzoyl chloride; thione or selenone groups; nitrosoamine groups; beta anilinovilyn groups; aminogroups; hydrazone groups, e. g., $-N=NH_2$; cyano groups, et cetera.

The preparation of bis- salts may be typified by the interaction or dye condensation of (a) one mol of ethylene-bis-alpha-methylbenzothiazole dibromide and two mols of alpha-methylmercaptoquinoline ethyl bromide and (b) one mol of ethylene-bis-alpha-methylmercaptoquinoline dibromide and two mols of alpha-methylbenzothiazole methyl bromide, in the presence of a basic condensing agent, e. g., a strong organic condensing (or acid binding) agent. The first reaction (a) takes place in accordance with the equation:

the presence of an acid binding agent, e. g., piperidine, dimethylamine, trimethylamine, et cetera.

It will be readily appreciated that each of the two aspects of the invention are quite broad and comprehend a large class of compounds. The monomeric poly-, particularly the monomeric bis-type as distinguished from the polymeric type, may be carried out with a large number of polycycloammonium salts having reactive groups. Thus, in addition to the condensation of polyheterocyclic quaternary (or poly-cycloammonium) salts which contain reactive methyl and methylmercapto groups, there may be used similar compounds containing as the reactive group a reactive halogen atom, ethylmercapto alkylselenoether group, acylmethylene derivative, formed by the condensation of a reactive methyl group with an acyl halide, i. e., acetyl chloride, propionyl chloride, crotonyl chloride, benzoyl chloride, etc., thioene or selenone groups, nitrosoamine group, beta-anilinovinyl group, amino group, hydrazone group, e. g. $-N=NH$; cyano groups, and alkyl

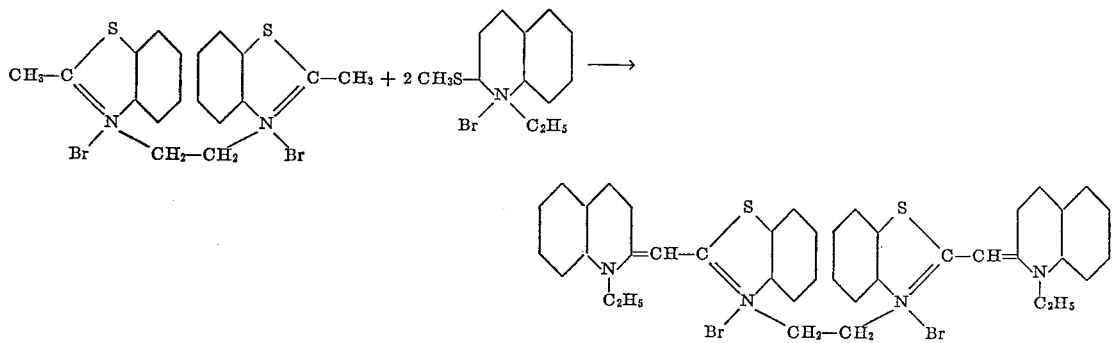

and the second (b) in accordance with the equation:

ethyl groups, etc. The reactive compounds just described can be reacted with a monomeric or

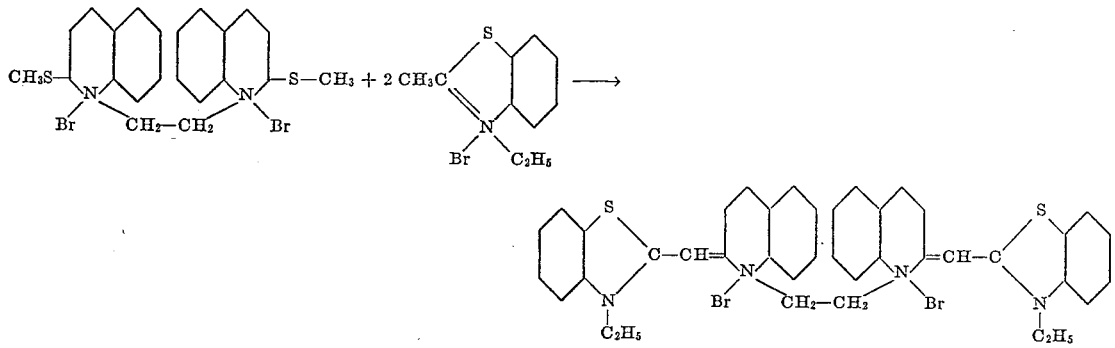

The preparation of polymeric cyanine salts which have recurring poly-cyanine dye nuclei may be similarly typified by the interaction or dye condensation of (a) a poly-heterocyclic quaternary (or poly-cycloammonium salt) having the requisite reactive group or (b) of one poly-heterocyclic quaternary salt having a reactive group with a different poly-heterocyclic quaternary salt having a reactive group capable of condensation therewith. To be more specific, a novel and useful class of polymeric cyanine dyes can be made by condensing N,N'-ethylene-bis-(2-methylbenzothiazole) dibromide in the presence of an acid binding agent, e. g., pyridine, piperidine, dimethylamine, trimethylamine, etc.

A novel class of polymeric pseudocyanine dyes which constitute a preferred aspect of the invention, for instance, can be made by reacting one mol of N,N'-ethylene-bis-(2-methylmercaptoquinoline)-dibromide with one mol of N,N'-ethylene-bis-(2-methylbenzothiazole)-dibromide in monofunctional cycloammonium salt containing similar reactive groups.

The poly-, especially the bis-type cyanine dyes and the polymeric type having recurring cyanine dye nuclei, are particularly useful in the preparation of spectrally sensitized photographic silver halide emulsions. They are not limited in their use to any particular type of silver salt, but actually can be used with simple and mixed silver halide emulsions and mixed emulsions in general. They definitely have utility in silver chloride, silver bromide, silver-chloride-bromide, silver-bromide-iodide, silver-chloride-bromide-iodide, etc., emulsions. They are also useful in mixed emulsions, for instance, those having the proportion of 25% chloride emulsions to 75% chlorobromide emulsion to 75% chloride emulsion to 25% chlorobromide emulsion. The dyes can be added to one or more of such emulsions prior to mixing.

In the preparation of photographic emulsions containing such novel dyes, it is necessary only to bring the dye into intimate contact with the light sensitive silver salt grains whereby they become dyed or absorb or adsorb the dye. This can be accomplished by dispersing the compounds in the emulsions before coating the light sensitive layers or afterwards by bathing or impregnating the layer with the polymeric dyes. It is convenient to add the dyes to the emulsions in the form of solutions in appropriate solvents. The solvent must, of course, be compatible with the emulsion, substantially free from any deleterious effect on the light sensitive materials in the emulsions and capable of dissolving the dyes. Methanol is a satisfactory solvent for my new dyes. Acetone can be employed. The dyes are advantageously incorporated in the finished washed emulsion and should be uniformly distributed throughout the emulsions.

The concentration of the new dyes in the emulsions can vary widely, e. g., from about 2 to 100 mg. per liter of ordinary flowable gelatino-silver-halide emulsion. The concentration of dye will vary according to the type of light sensitive materials employed in the emulsion and according to the effects desired. The suitable and most economical concentration for any given emulsion will be apparent to those skilled in the art, upon making ordinary tests and observations customarily employed in the art of emulsion making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 100 cc. of a flowable gelatino-silver-halide emulsion with stirring. Stirring is continued until the dye is thoroughly incorporated in the emulsion. Ordinarily from 10 to 20 mgs. of our new dyes per liter of emulsion suffice to produce the maximum sensitizing effect.

The invention will be more fully illustrated but is not intended to be limited by the following examples:

*Example A*

Nine grams of 2-methylmercaptoquinoline and 4.7 g. of ethylenedibromide were heated in a sealed tube in a steam bath for 48 hours. The resulting bis-heterocyclic quaternary salt was a white solid. It was dissolved in alcohol heated to about 70° C. and enough ether added to produce a slight precipitate. On chilling in a salt-ice bath 1,1'-ethylene bis(2-methylmercaptoquinolinium) dibromide of the formula:

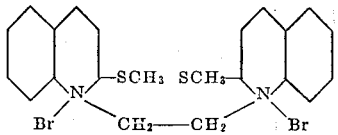

which crystallized as a white powder, was formed. It had a melting point of 218 to 223° C. It was filtered and dried in a vacuum desiccator.

By substituting trimethylenedibromide, tetramethylenedibromide, pentamethylenedibromide, hexamethylenedibromide in similar molar proportions for the ethylene dibromide the following compounds were made:

1. Trimethylene bis (2 methylmercaptoquinolinium) dibromide. Melting point 194–198° C., tan powder.
2. Tetramethylene bis (2 methylmercaptoquinolinium) dibromide. 182°+ C., tan powder.
3. Pentamethylene bis (2 methylmercaptoquinolinium) dibromide. 186°+ C., tan powder.
4. Hexamethylene bis (2 methylmercaptoquinolinium) dibromide. 191°+ C., white powder.

Similarly by substituting hexamethylene dibromide and 2-5 dimethylselenazole for the reactants of Example I the compound hexamethylene bis (2-5-dimethylbenzoselenazole) dibromide was made.

*Example I*

1',1'''-ethylene bis (3-ethyl-5-methyl selenopseudocyanine) dibromide of the formula:

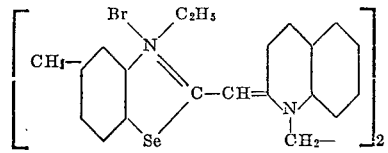

One gram of N,N'-ethylene bis (2-methylmercaptoquinoline) dibromide and 1.2 g. of 2,5-dimethyl-benzoselenazole ethobromide were dissolved in 50 cc. of absolute alcohol, and the solution heated to refluxing. 2.5 cc. of triethylamine was then added, and refluxing continued for thirty minutes. After cooling and diluting with ether the dye was filtered, washed with water, and recrystallized twice from alcohol. The dye obtained having the above name was a bright, red-orange solid having a melting point of 248° C. The resulting dye, which analyzed

|   | Found | Theoretical |
|---|---|---|
| C | 54.54–54.53 | 54.8 |
| H | 4.24–4.26 | 4.35 |
| N | 6.03–6.02 | 6.09 | is named above, was added in an amount of 20 mg. to a liter of gelatino-silver-bromide emulsion containing silver bromide and silver iodide and gelatin. It extended the spectral sensitivity of the emulsion to 5960 Å. with a maximum at 5570. The characteristics of this dye are given in Fig. I of the drawing.

*Example II*

One gram of N,N'-trimethylene bis (2-methylmercaptoquinolinium) dibromide and 1.2 grams of 2,5 - dimethyl - benzoselenazole ethylbromide were dissolved in 50 ccs. of absolute alcohol and the solution heated to refluxing. Two and one-half ccs. of triethylamine were then added and refluxing continued for about 35 minutes. After cooling and diluting with ether the dye was filtered, washed with water, and recrystallized twice from alcohol. The dye 1',1'''-trimethylene-bis-(3-ethyl-5-methyl selenopseudocyanine) dibromide which was a bright red-orange dye having a melting point of 238° C. was obtained. It had the formula:

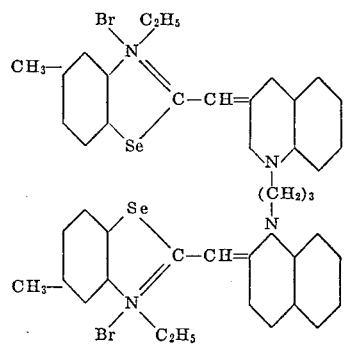

Figure 2:
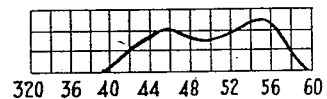

When added to an emulsion in similar amounts after the manner of Example II it was found to extend the sensitivity to 5920 Å. with a maximum at 5550 Å. The sensitizing curve is shown in Fig. 2 of the drawing.

Figure 2A:
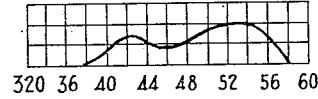

When added to a silver chloride emulsion in similar amounts it extended its sensitivity to 5800 Å. with a maximum of 5350 Å. and a minimum of 4520 Å. Its curve is shown in Fig. 2A.

*Example III*

N,N'-tetramethylene bis (2-methylmercaptoquinolinium) dibromide was substituted in like amount for the bis cycloammonium salt of Example III and 1',1'''-tetramethylene-bis-(3-ethyl-5-methylselenopseudocyanine) dibromide recovered. It was an orange-red dye having a melting point of 240° C. and the formula:

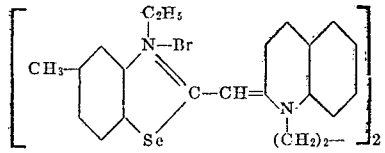

Figure 3:
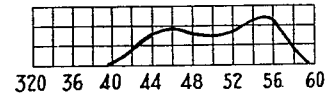

When added to an emulsion after the manner of Example II it extended the sensitivity to 5920 Å. with a maximum of 5570 Å. and a minimum at 5000 Å. The sensitizing curve is shown in Fig. 3 of the drawing.

*Example IV*

N,N' - pentamethylene-bis-(2-methylmercaptoquinolinium) dibromide was substituted for the bis salt of Example III and 1',1'''-pentamethylene-bis-(3-ethyl-5-methyl selenopseudocyanine) dibromide obtained. It was a red-orange dye having a melting point of 247–9° C. and the formula:

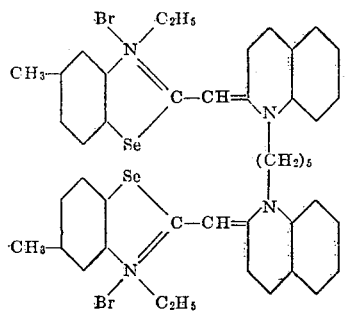

Figure 4:
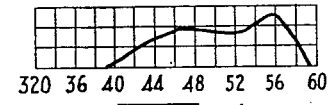

When added to an emulsion as in Example II it extended the sensitivity to 5960 Å. with a maximum at 5600 Å. and a minimum at 5050 Å. The sensitizing curve is shown in Fig. 4 of the drawing.

*Example V*

N,N' - hexamethylene - bis-(2-methylmercapto quinolinium) dibromide was substituted for the bis salt of Example III and 1',1''-(hexamethylene-bis-(3 ethyl-5-methyl selenopseudocyanine) dibromide obtained. It was a red-orange dye having a melting point of 243° C. of the formula:

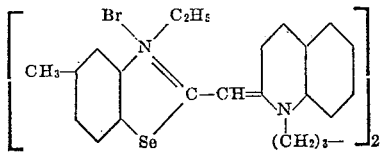

Figure 5:
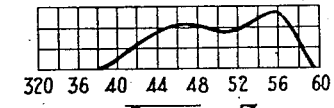
Figure 5A:
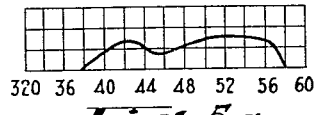

When added to a silver bromide emulsion as in Example II it extended the sensitivity to 5920 Å. with a maximum at 5570 Å. and a minimum at 5100 Å. The sensitizing curve is shown in Fig. 5 of the drawing. When added to a lithographic (silver chloride) emulsion in a similar manner it extended its sensitivity as shown in Fig. 5A.

*Example VI*

3,3' - hexamethylene - bis-(5 methyl-1''-ethyl selenopseudocyanine) dibromide

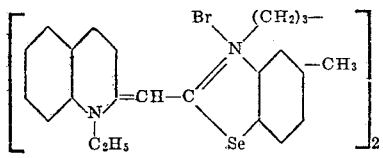

was prepared by reacting 2 g. of N-N' hexamethylene bis (2–5 dimethylbenzoselenazole) dibromide mixed with 1.75 g. of alpha methylmercaptoquinoline ethbromide in 100 ml. of absolute alcohol. The solution was heated to boiling, and 4 ml. of triethylamine was added. A deep red color developed immediately. The solution was refluxed for 30 minutes, cooled, filtered, and the orange-red dye was recrystallized twice from alcohol.

Figure 6:
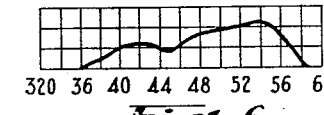
Figure 6A:
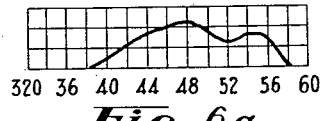

When added to a silver bromide emulsion as in Example II it extended the sensitivity to 5850 Å. with a maximum at 5400 Å. and a minimum of 4500 Å. as shown in Fig. 6. When added to a silver chloride (lithographic) emulsion it extended its sensitivity as shown in Fig. 6A.

*Example VII*

One mol of N,N' - hexamethylene - bis -(2-methylmercapto-quinolinium) dibromide was reacted with one mol of N,N'-hexamethylene-bis-(1-methyl-benzothiazole) dibromide in a manner similar to Example II using absolute alcohol as a solvent medium and trimethylamine as the acid binding agent. It was heated under reflux for 1½ hours and then recrystallized from methanol. The polymeric (1',1'''-hexamethylene-bis-3,3''-hexamethylene-bis-thiapseudocyanine) polybromide obtained was a red colored dye and having a melting point of 257 to 297° C. and the formula:

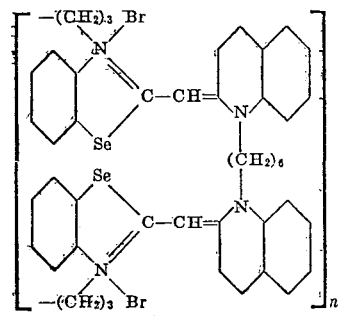

wherein n is a positive integer, e. g., 2, 3, 4, etc.

Figure 7:
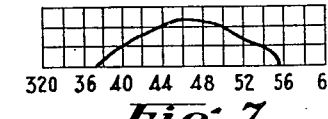
Figure 7A:

When added to an emulsion as stated in Example II it extended the sensitivity to 5500 Å. with a maximum at 4800 Å. shown in Fig. 7. When added in like manner to a silver chloride emulsion it extended its sensitivity as shown in Fig. 7A.

While nearly all of the above examples are concerned with the preparation of polymethylene bis-cyanine dyes and especially polymethylene-bis-dyes of the pseudocyanine class, the invention is not limited to that preferred class of compounds. On the contrary, various other hydrocarbon nuclei may be present as a bridging radical between the heterocyclic nitrogen atoms of the heterocyclic nitrogen nuclei as has been taught above and in application Serial No. 409,433. Thus, in place of the 2-methylmercaptoquinoline of Example I can be substituted other heterocyclic nitrogen bases having reactive groups to form bis, tris, etc. salts. Suitable specific bases include alpha-picoline, gamma-picoline, 2,6-lutidine, 2,4-lutidine, 2,5-lutidine, 2-methylbenzoxazole, 2-methyl-beta-naphthoxazole, 2-methylbenzoselenazole, 2-methyl-beta-naphthothiazole, 1-methyl-alpha-naphthothiazole, 2-methylthiazole, 2-methyloxazole, 2-methyl-6-aminobenzothiazole, 2-methyl-5-aminobenzothiazole, 2,6-dimethyl - 5 - aminobenzothiazole, 2,4-dimethyl-6-aminobenzothiazole, 2,4,6-trimethyl-7-aminobenzothiazole, 2-methyl-6-diethylaminobenzothiazole, 2 - methyl - 5 - dimethylaminobenzothiazole, 2,4 - dimethyl - 6 - phenylaminobenzothiazole, 2-methyl - 6 - acetylaminobenzothiazole, 2,4,6 - trimethyl-7-acetylaminobenzothiazole, 2,5-dimethyl-4-acetylthiazole, 2,5-dimethyl-4-benzoyl thiazole, 2,5-dimethyl-4-picolinyl thiazole, 2,5-dimethyl-4-thiazole carboxyanilidide, 2-methyl-5-(2-pyridyl)-4-thiazole carboxyanilide, ethyl-2,5-dimethyl-4-thiazole carboxylate, 2-methyl-4-furylthiazole, 2-methyl-4-furyl thiazole, 2-methyl-4-thienyl thiazole, 2-methyl-4-(2-pyridyl) thiazole and the corresponding oxazoles and selenazoles, 2-methyl-5-ethoxy benzthiazole, 2,5,5-trimethyl-benzselenazole, 2-methyl-5:6-dimethoxybenz-thiazole, 2-methyl-5-methoxy-selenazole, 2-methyl-6-ethoxy-benz-thiazole, 5:6-benzthiazole, alpha-methyl-4:5-methylenedioxy benz-thiazole, lepidine, 6-methyl lepidine, 1,3,3-trimethyl-2-methylene indoline, N-ethyl-e-methylene dihydroquinoline, N-ethyl-6,7-dimethyl-2-methylene dihydroquinoline, N-methyl-6-chloro-2-methylene dihydroquinoline, 1,3 4-trimethyl-2-methylene naphthindoline, 2-methyl thiazoline, 2-methyl selenazoline, 2,6-dimethyl pyridine, 2,6-dipropyl pyridine, 2 methyl-6-ethyl pyridine, 2,4,6-trimethyl pyridine, 2,6-dimethyl-4-phenyl pyridine, 2,6-dimethyl-4-benzylpyridine.

Similarly, in place of the polymethylene bromides of the above examples, can be substituted other polyfunctional hydrocarbon derivatives capable of forming bis, tris, etc. salts. Useful compounds include the following:

A. Polyhalogen substituted alkanes such as methylene dibromide, methylene chloride, propylene dibromide-1,2, butylene dichloride ethylene and propylene di-iodides, isobutyl dibromide, triiodo-triethylmethane, 1.1 dibromoethane, bromoform, acetylene-tetrabromide, hexabromethane, and aromatic substituted alkanes, e. g., benzylidine-dichloride, omega, omega'-xylylenedibromide, omega, omega, omega'-xylylenedichloride, cyclohexane dibromide-1,2, -1,3, and -1,4, 1,3-dibromo-2-hydroxy-propane, etc.

B. Alkyl esters of alkylene and cycloalkylene sulfonic acids, such as methane disulfonic dimethyl ester, ethane and alpha-beta disulfonic diethyl ester, ethane alpha:alpha disulfonic dimethyl ester, the diethyl ester of ethane alpha: beta disulfonic acid, alpha:beta propane disulfonic diethyl ester, alpha:beta propane disulfonic diethyl ester, beta-methyl propane alpha:beta disulfonic dimethyl ester, the diethyl esters of (n-hexane, n-heptane) and n-octane disulfonic acids, methane trisulfonic triethyl ester, ethane alpha:alpha:beta trisulfonic triethyl ester, propane alpha:beta:gamma trisulfonic triethyl ester, etc.

C. Alkyl esters of arylene sulfonic acids such as the diethylester of phenyl disulfonic acid, the dimethyl ester of naphthalene disulfonic acid, the dimethyl ester of diphenyl disulfonic acid, the triethyl ester of phenyl trisulfonic acid.

D. Various alkyl disulfates such as dimethyl alpha:beta ethane disulfate, diethyl alpha:beta ethane disulfate, etc.

E. Esters of sulfonic acids with polyhydric alcohols, e. g., the alkyl, cycloalkyl, and aryl sulfonic acid esters with glycerol and the glycols. Suitable esters include:

Ethylene di (ethyl sulfonate)
Ethylene di (p-toluene sulfonate)
Ethylene di (cyclohexyl sulfonate)
p-Phenylene di-(p-toluene sulfonate)
Propylene di (p-toluene sulfonate)
Hexamethylene di (p-toluene sulfonate)

F. Mixed compounds derived from combining functional aspects of A, B, C, D, and E, such as the alpha bromo, beta ethyl sulfonates of ethane.

It is apparent from the above that the hydrocarbon linking radical may be substituted by various groups which do not form ternary salts, e. g., nitro, primary, secondary and tertiary amino groups; hydroxyl, carbonyl, thiocarbonyl, heterocyclic, and hydrocarbon groups.

In like manner, one of the above bis cycloammonium salts can be reacted with another, different bis-cycloammonium salt to form polymeric bis-cyanine dyes similar to that of Example VII. By merely varying one of the bis salts of that example, a number of similar polymeric bis dyes can be made. When both bis salts are varied, a large number of such dyes can be obtained.

The products of this invention are useful in photography, particularly as sensitizing dyes employed to extend the spectral sensitivity of gelatino silver halide emulsions in the manner known to the art. More specifically, they are particularly useful as sensitizing dyes for use in elements having two emulsion layers with markedly different gradations which are selectively sensitized to different regions of the spectrum. In addition, the compounds are useful in color photography for the preparation of bleaching out layers in which the dyes are unstabilized to light and can be bleached to form colored pictures by one or more of the processes known to the art. The products are also useful in the preparation of colored filter or screening layers both for photography and other fields of optical science. Because of their amorphous colloidal nature many of the polymeric products contemplated in the invention are useful in the preparation of foils, films, and coatings wherein they may be mixed with various hydrophilic colloids or similar materials, or they may be used alone to produce the desired film or coating element.

In some instances self supporting films of the novel polymeric dyes can be made. Those types having colloidal properties might be used to replace gelatin and similar substances for photographic elements such as binding agents for light sensitive salts. Or they may be used as porous membranes, or strata which could be impregnated with light sensitive salts. They could, furthermore, be used as filter layers, color layers, anti-abrasion layers, backing layers, etc.

The novel polymeric dyes can be used in conjunction with emulsion hardening agents, emulsion desensitizers, surface modifiers, fog-inhibiting agents, etc., and monomeric sensitizing dyes of the cyanine, carbocyanine, merocyanine, neocyanine, styryl, etc., dyes.

One advantage of the invention is that it permits the adsorption of sensitizing dye molecules on silver halide grains in multi-molecular layers of controllable depth and configuration. Of comparable advantage is the fact that the invention provides a series of cyanine-type sensitizing dyes which are "non-wandering" or substantially non-diffusible through the hydrophilic colloids such as gelatin which comprise the binding materials of silver halide emulsions. True, non-wandering, sensitizing dyes permit mixed halide emulsions to be prepared having outstanding properties for sharply recording individual spectral bands. A further advantage is that the invention permits the preparation of photographic layers from self binding dye materials which form cohesive, resistant films suitable for light sensitive silver halide layers, bleachable dye layers or filter layers. A still further advantage is that the invention provides dyes of the cyanine class substantive to materials which normally could not be dyed. Another advantage resides in the fact that the invention makes possible the preparation of highly colored films, foils, filaments and plastics in which the dye molecule is an integral part of the synthetic material.

As many apparently widely different embodiments of this invention may be made without departing from the spirit and scope thereof, it is to be understood that the invention is not to be limited except as defined by the appended claims.

I claim:
1. A bis-cyanine dye of the general formula:

where Z and Z' constitute the atoms necessary to complete a heterocyclic nitrogen nucleus usual in cyanine dyes, the carbon atoms C are in a position taken from the alpha and gamma positions with reference to the heterocyclic nitrogen atoms, Q is a trivalent bridging radical of the type usual in cyanine dyes radical which forms a conjugated chain of atoms between the intracyclic nitrogen atoms of the two adjacent heterocyclic nuclei, A is a divalent hydrocarbon radical connected through an acyclic carbon atom to the intracyclic nitrogen atoms, R is a monovalent hydrocarbon radical taken from the group consisting of alkyl and aralkyl radicals and X is the negative radical of an acid.

2. A bis-cyanine dye of the general formula:

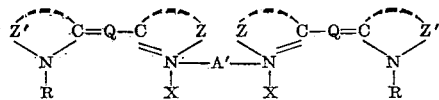

wherein Z and Z' constitute the atoms necessary to complete an azole nucleus, Q is a trivalent bridging radical of the type usual in cyanine dyes radical which forms a conjugated chain of atoms between the intracyclic nitrogen atoms of the two adjacent azole nuclei, A' is a polymethylene radical, R is a hydrocarbon radical taken from the group consisting of alkyl and aralkyl radicals and X is the negative radical of an acid.

3. A bis-cyanine dye of the general formula:

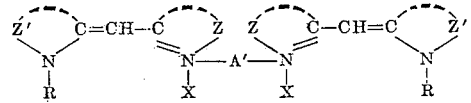

wherein Z and Z' constitute the atoms necessary to complete an azole nucleus, A' is a polymethylene radical, R is a hydrocarbon radical taken from the group consisting of alkyl and aralkyl radicals and X is the negative radical of an acid.

4. A bis-pseudo-cyanine dye of the general formula:

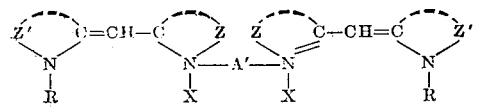

wherein Z and Z' constitute the atoms necessary to complete a quinoline nucleus, A' is a polymethylene radical, R is a hydrocarbon radical taken from the group consisting of alkyl and aralkyl radicals and X is the negative radical of an acid.

5. The process which comprises condensing a bis heterocyclic quaternary salt of the general formula

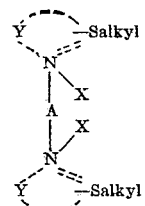

where Y constitutes the atoms necessary to complete a radical taken from the group consisting of oxazole, thiazole, selenazole, iminazole, indolenine, and pyridine radicals and the alkyl mercapto radicals contain from 1 to 2 carbon atoms and are in one of the positions alpha and gamma to the heterocyclic nitrogen atoms, X is the negative radical of an acid, and A is a divalent hydrocarbon radical linked to the nitrogen atoms through an aliphatic carbon atom thereof with two moles of a heterocyclic nitrogen quaternary salt containing a heterocyclic nitrogen nucleus usual in cyanine dyes and having a reactive methyl group in one of the positions alpha and gamma to the heterocyclic nitrogen atom by admixing the components with a solvent.

6. The process which comprises condensing one mol of a bis quaternary azole salt of the formula

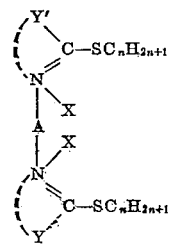

where Y' constitutes the atoms necessary to complete an azole nucleus, $n$ is an integer from 1 to 2, X is the negative radical of an acid, and A is a divalent hydrocarbon radical linked to the nitrogen atoms through an aliphatic carbon atom, with two mols of a quinoline quaternary salt containing a reactive methyl group in the alpha position to the heterocyclic nitrogen atom thereof, by admixing the components with a solvent.

7. The process which comprises condensing one mol of a bis quaternary quinoline salt of the formula

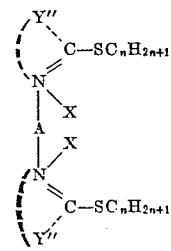

wherein Y'' constitutes the atoms necessary to complete a quinoline nucleus, $n$ is an integer from 1 to 2, X is the negative radical of an acid, and A is a divalent hydrocarbon radical linked to the nitrogen atoms through an aliphatic carbon atom thereof, with two mols of an azole quaternary salt containing a reactive methyl group in the alpha position to the heterocyclic nitrogen atom by admixing the components with a solvent.

8. The process which comprises condensing a mol of a bis salt of the formula

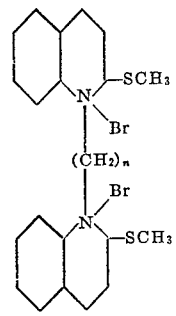

where $n$ is an integer of 1 to 6, with two mols of 2,5-dimethyl-benzoselenazole ethyl bromide, by admixing the components with a solvent and an acid binding agent and heating the mixture and recovering a polymethylene-bis-pseudocyanine dye.

9. 1', 1'''-ethylene bis (3-ethyl-5-methyl-selenopseudocyanine) dibromide of the formula

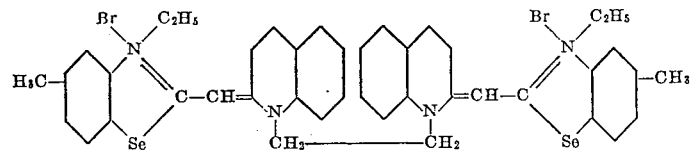

10. 1', 1'''-trimethylene bis (3-ethyl-5-methyl-selenopseudocyanine) bromide of the formula

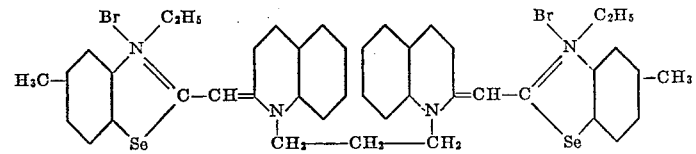

11. 1', 1'''-tetramethylene bis (3-ethyl-5-methyl selenopseudocyanine) dibromide of the formula

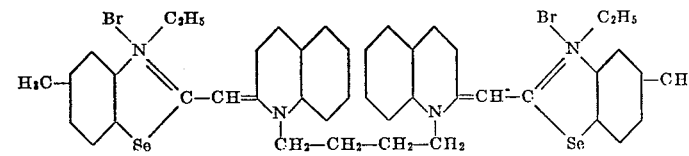

CYRIL D. WILSON.

REFERENCES CITED

The following references are of record in the file of this patent:

UNITED STATES PATENTS

| Number | Name | Date |
|---|---|---|
| 2,158,287 | Konig | May 16, 1939 |
| 2,282,116 | Brooker | May 5, 1942 |
| 2,263,749 | White | Nov. 25, 1941 |